United States Patent
Buch et al.

(10) Patent No.: US 8,737,011 B1
(45) Date of Patent: May 27, 2014

(54) REPEATABLE RUNOUT DATA STORED IN PRE-SERVO GAP

(71) Applicant: Seagate Technology LLC, Cupertino, CA (US)

(72) Inventors: Bruce Douglas Buch, Westborough, MA (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/917,731

(22) Filed: Jun. 14, 2013

(51) Int. Cl.
*G11B 5/596* (2006.01)

(52) U.S. Cl.
USPC .................................................. 360/77.02

(58) Field of Classification Search
USPC .............. 360/51, 77.02, 75, 48, 77.04, 77.08, 360/77.03, 72.1, 77.11
See application file for complete search history.

(56) References Cited

U.S. PATENT DOCUMENTS

| 6,765,748 B2 | 7/2004 | Shu |
| 7,551,379 B2 * | 6/2009 | Yu et al. ........................ 360/51 |

* cited by examiner

*Primary Examiner* — Nabil Hindi
(74) *Attorney, Agent, or Firm* — Hollingsworth Davis, LLC

(57) ABSTRACT

A data storage medium has first and second data sectors of a track, a pre-servo gap being proximate the first data sector. The data storage medium also includes a servo wedge that stores servo data for the track. A start of the servo wedge is proximate to the pre-servo-gap and an end of the servo wedge is proximate to the second data sector. A repeatable runout field is included in the pre-servo gap.

20 Claims, 4 Drawing Sheets

REPEATABLE RUNOUT DATA STORED IN PRE-SERVO GAP

SUMMARY

The present disclosure is related to repeatable runout correction values stored in a pre-servo gap. In one embodiment, a data storage medium includes first and second data sectors of a track, a pre-servo gap being proximate the first data sector. The data storage medium includes a servo wedge that stores servo data for the track. A start of the servo wedge is proximate to the pre-servo-gap and an end of the servo wedge is proximate to the second data sector. A repeatable runout field is included in the pre-servo gap.

In another embodiment, a system includes a slider having a read transducer and a write transducer separated by a downtrack separation distance. The system includes a data storage medium configured to rotate proximate to the slider. The data storage medium includes first and second data sectors of a track and a pre-servo gap proximate the first data sector. The pre-servo gap has a size that corresponds to at least the downtrack separation distance. A servo wedge stores servo data for the track. A start of the servo wedge is proximate to the first data sector and an end of the servo wedge is proximate to the second data sector. Located in the pre-servo gap is a repeatable runout field that stores repeatable runout data.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is generally related to arrangement of servo wedges (also referred to as servo sectors) on a recordable medium (e.g., magnetic disk) of a hard drive. The servo wedges enable a servo control system to determine precisely where on the recordable medium a read/write head is located. The servo sectors may be pre-formatted on the recordable medium during manufacturing. The servo wedges are generally interspersed on the hard drive between data sectors. The data sectors are partitions within a track used to store user data on the hard drive.

The recordable medium may be formatted so that there is a gap (also referred to herein as a pre-servo gap) between a servo wedge and a data sector that immediately precedes the servo wedge. For purposes of this disclosure, the terms "preceding," "following," "prior to," "before," "after," "leading," "trailing," etc., refer to an order that a wedge or sector is encountered by a read/write head that is held over the spinning medium. An example of a pre-servo gap 100 according to an example embodiment is shown in FIG. 1.

Figure 1:
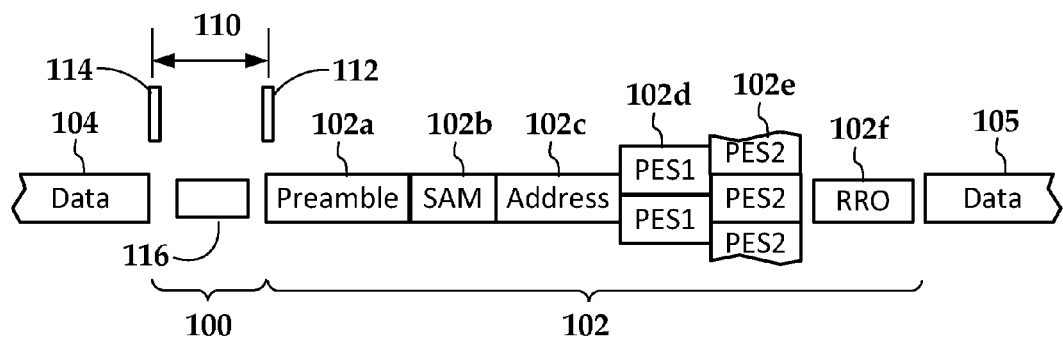
FIG. 1 is a block diagram of a servo wedge according to an example embodiment.

Generally, FIG. 1 represents an arrangement of data portions within a servo wedge 102. The servo wedge 102 is located between a preceding data sector 104 and a following data sector 105 of a track. The data sectors 104, 105 store user data, and present disclosure may be used with any type and arrangement of data sectors. The pre-servo gap 100 is shown as being separate from the servo wedge 102, located between preceding data sector 104 and the servo wedge 102. In other conventions, the pre-servo gap 100 may be considered part of the servo wedge 102. Regardless of whether the pre-servo gap 100 is considered as part of the servo wedge 102 or not, generally the pre-servo gap 100 includes a region where no user or servo data is currently stored for reasons given below.

The illustrated servo wedge 102 includes a preamble 102a, servo address mark (SAM) 102b, servo address 102c, position error sensor (PES) fields 102d, 102e, and one or more repeatable runout (RRO) fields 102f. The preamble 102a is a known magnetic pattern that is read back as a signal. The SAM 102b also includes a known pattern of bits that are read following the preamble 102a. Together, the preamble 102a and SAM 102b allow a read/write channel to positively determine that the beginning of the servo wedge 102 has been detected, and facilitates synchronizing the servo signal to read the subsequent data stored in the servo wedge 102.

The address field 102c includes a pattern (e.g., Gray code) that identifies the track in which the servo wedge 102 is located. The PES fields 102d, 102e are burst fields that are used to determine a position error signal. For example, the PES fields 102d, 102e may facilitate controlling alignment and seek movements of the read/write head. The RRO fields 102f also facilitate proper alignment of the read/write heads on a track by correcting for known errors.

Generally, RRO refers to imperfections in the shape of the magnetically written servo tracks on the media. For example, magnetic disks have a spindle that may be offset by some measurable offset from absolute center. This offset causes runout when the disk is spinning. The magnitude and direction of the runout can be detected and recorded during manufacture. As a result, the value of the runout is known and repeatable, and so can be used by the hard drive to more accurately locate tracks on the magnetic medium during use.

The RRO field 102f contains RRO correction values that can be used to compensate for RRO during tracking by the read/write head. Because the read and write heads are physically separate in a slider that is held over the disk, different runout values may be stored in the servo wedge for the read head and write head. For purposes of this discussion, these different RRO values are referred to as W-RRO for data-write runout and R-RRO for data-read runout.

The above-noted separation between read and write heads on the slider is also one reason why the pre-servo gap 100 is included. As indicated in FIG. 1, a read head 112 (also referred to as read transducer, read stack, etc.) is separated from a write head 114 (also referred to as write transducer, write pole, etc.) by a distance 110. In the illustrated arrangement, the recording medium moves relative to the slider such that the read head 112 encounters the servo wedge 102 before the write head 114.

Generally, the use of the read head 112 and write head 114 may be mutually exclusive. This generally indicates that, while the write head 114 is writing to the recording medium, the read head 112 may not be able to read from the medium (and vice versa). As such, if the pre-servo gap 100 was not present, there may be situations where the write head 114 is still writing to preceding data sector 104 while the read head 112 was past the start of the preamble 102a, or even past the start of the SAM 102b. In such a case, the device would be unable to read the rest of the servo wedge 102, because it would not be able to determine the starting point of the address field 102c and other fields within the servo wedge 102.

It should be noted that, while the illustrated pre-servo gap 100 is shown in the figure as having approximately the same length as the read/write separation distance 110, in practice the gap length may be made larger to allow for transition time between read/write modes, and to allow for physical and electrical tolerances. The distance required for the transition between writing and reading may vary depending on rotation speed and other factors, and so the length of the pre-servo gap 100 may be made large enough to account for a range of rotation speeds possible for a device or family of devices. So while the pre-servo gap 100 has a length that is designed to correspond to at least the read/write separation distance 110, this does not require that it be equal to the read/write separation distance 110.

As should be apparent, the pre-servo gap 100 represents a portion of the recording medium that is not being used for storing any data. However, it is possible for the pre-servo gap 100 to be used for storing some data, as indicated by data block 116, so long as the data block 116 in the pre-servo gap 100 is not needed when the read/write head is writing just prior to encountering the pre-servo gap 100.

In embodiments described below, at least some RRO correction values currently stored in RRO fields 102f are proposed for being stored in the pre-servo gap 100. This frees up an equivalent (or nearly so) area in RRO field 102f where this value may currently be stored, resulting in a smaller servo wedge 102. The smaller servo wedge 102 can result in an increased data storage capacity of the storage device. This increased storage can increase the storage capacity advertised to the end user, and/or be held in reserve for other uses, e.g., spare storage space to replace bad sectors, store additional metadata, etc.

The RRO field 102f used to record the RRO correction values consumes media area that could otherwise be used for other data. The RRO field 102f (with both R-RRO and W-RRO values) may take a relatively large amount of space in cases where RRO values are recorded at a servo frequency which is lower than the data frequency. For example, the RRO values may be encoded using low-rate modulation codes (wide-biphase=4T per bit, where T refers to a servo clock period). Thus the physical length of the RRO field 102f may be in on the order of the combined length of the preamble 102a, SAM 102b, and associated parity fields. If some RRO data is instead stored in the pre-servo gap 100, an increase in format efficiency will result.

If the pre-servo gap 100 is at least nominally the length of the reader-writer separation distance 110, it might not be possible to store the W-RRO value in the pre-servo gap 100. This is because the W-RRO value needs to be read when positioned for data writing, and accommodating the reader-writer spatial separation 110 would require reading the W-RRO in the pre-servo gap 100 while at the same time writing data to data sector 104. As described above, reading and writing operations may be mutually exclusive, and so this may not be possible.

In contrast to the W-RRO, the R-RRO correction value only needs to be read when positioned for data reading, which makes it a viable candidate for storage in the pre-servo gap 100. The read head 112 can transition directly from reading data sector 104 to reading data block 116, which in this case stores an R-RRO correction value. It should be noted that any other data that is only of interest to the read head 112 or to read operations may be stored in the pre-servo gap 100 instead of or in addition to R-RRO correction values.

It will be appreciated that the concepts described for configurations where the read head is in front of the write head may also be applicable to configurations where the write head is in front of the read head. In such a case, a post-servo gap would be provided between the servo wedge and the following data sector so that the servo wedge could be read to completion before switching to write mode in the following data sector. In such a case, data could be stored in the post-servo gap so long as such data is not used for a write operation in the following data sector, because the write head will be already be positioned over the next data sector while reading the post-servo gap data. As such, a post-servo gap could store R-RRO values, or any other data only of interest to operations affecting the read head but not to the write head.

The electronics required to support an RRO field in the pre-servo gap 100 need not be markedly different from what is used for the existing scheme that stores the RRO values at the end of servo wedge 102. An apparatus 200 that facilitates at least reading of RRO values in the pre-servo gap 100 according to an example embodiment is shown in the block diagram of FIG. 2.

Figure 2:
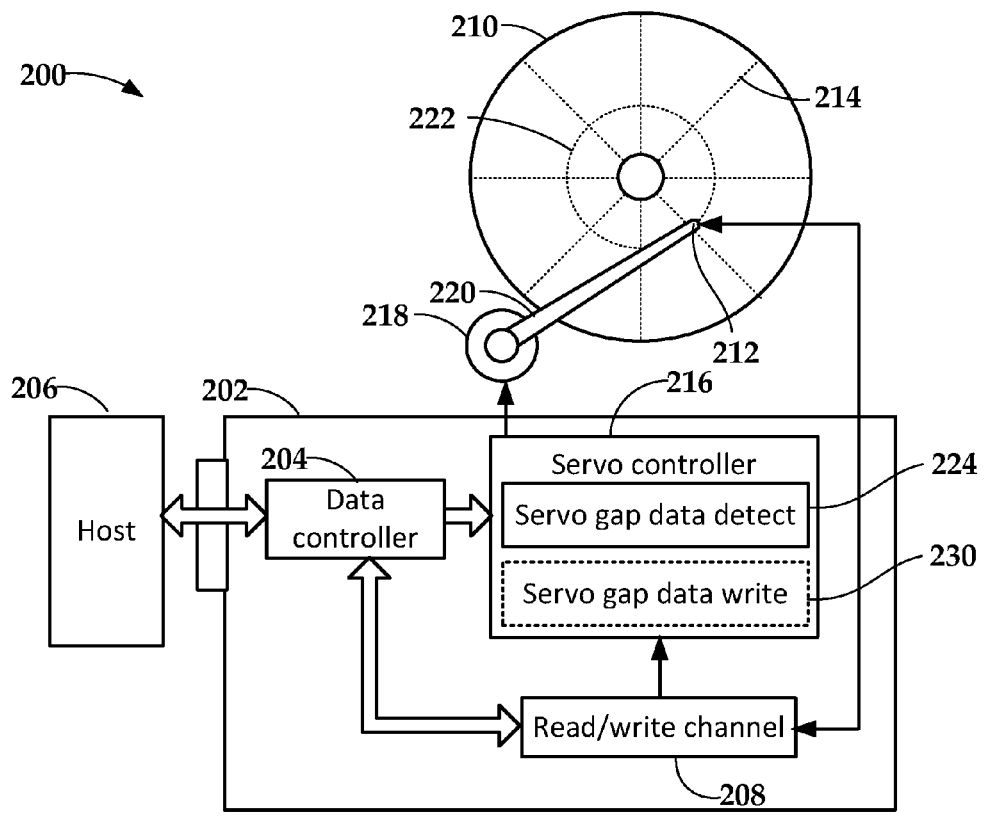
FIG. 2 is a block diagram of an apparatus according to an example embodiment.

In FIG. 2, a block diagram illustrates a control logic circuit 202 of a data storage apparatus 200. The circuitry 202 includes a data controller 204 that processes read and write commands and associated data from a host device 206. The host device 206 may include any electronic device that can be communicatively coupled to store and retrieve data from a data storage device, e.g., a computer, peripheral bus card, etc. The data controller 204 is coupled to a read/write channel 208 that reads from and writes to a surface of a magnetic disk 210.

The read/write channel 208 generally converts data between the digital signals processed by the data controller 204 and the analog signals conducted through one or more read/write heads 212. The read/write channel 208 also provides servo data read from servo wedges 214 on the disk 210 to a servo controller 216. The servo controller 216 uses these signals to drive an actuator 218 (e.g., voice coil motor, or VCM and/or micro-actuator) that rotates an arm 220 upon which the read/write heads 212 are mounted.

Data within the servo wedges 214 can be used to detect the location of a read/write head 212. The servo controller 216 uses servo data to move a read/write head 212 to an addressed track 222 and block on the disk 210 in response to the read/write commands (seek mode). While data is being written to and/or read from the disk 210, the servo data is also used to maintain the read/write head 212 aligned with the track 222 (track following mode).

Although two separate controllers 204 and 216 and a read write channel 208 have been shown for purposes of illustration, it is to be understood that their functionality described herein may be integrated within a common integrated circuit package or distributed among more than one integrated circuit package. Similarly, a head disk assembly can include a plurality of data storage disks 210, an actuator arm 220 with a plurality of read/write heads 212 (or other sensors) which are moved radially across different data storage surfaces of the disk(s) 210 by the actuator motor 218 (e.g., voice coil motor), and a spindle motor (not shown) which rotates the disk(s) 210.

As will be discussed in greater detail below, the circuitry 202 may include a servo gap data detect module 224 that assists in detecting RRO valued that are encoded within pre-servo gaps that precede servo wedges/sectors 214. In existing servo controllers, RRO values are read based on a programmed delay from servo sync-mark detection to indicate the approximate position of the subsequently read RRO field. In such a case, a preamble and sync may be included in the RRO fields. An RRO preamble/sync may not be required if the detection circuitry is precise enough to detect RRO by measuring a delay from the start of the servo wedge.

If an R-RRO value is stored in the pre-servo gap, the R-RRO field may be prepended with synchronization data that allows the R-RRO field to be detected independently from the servo wedges 214. This prepended data may be similar to the preamble and SAM of the servo wedge or similar to existing RRO preamble/sync within the servo wedge, although an in-gap RRO may have a different format than these.

In order to detect the R-RRO field in the pre-servo gap, the position of the R-RRO field may be detected using a servo sync-mark of a previously read servo wedge as the timing reference. An RRO value detected by using the sync-mark of servo wedge N need not be the value used for servo wedge N. In an RRO-in-gap scheme, an RRO value that is timing-referenced from servo wedge N may also apply to servo wedge N+1, which is the next (e.g., adjacent) servo wedge encountered by the read/write head. This would involve the servo gap data detect module 224 using a longer programmed delay (e.g., long enough to cover traversal of data sectors between the servo wedges) to detect R-RRO in the next encountered servo wedge.

Although using an increased delay to facilitate inter-wedge timing presents the potential for more accumulated timing error, conventional disk synchronous clock techniques which track spin-speed error are sufficiently accurate to largely mitigate accumulated timing error as a concern. Any residual increase in timing error can be accommodated by increasing the R-RRO preamble length and sync-detection window. The pre-servo gap is may be large enough to accommodate a generously long RRO preamble length. The servo gap data detect module 224 could also have additional functionality to manage these increased preambles and sync-detection windows.

Note that RRO corrections are generally written in the servo wedges once during manufacturing. Writing an RRO value in the pre-servo gap can leverage much of the existing RRO infrastructure. An apparatus or system similar to apparatus 200 in FIG. 2 may also be used for writing RRO values to the magnetic disk 210 during production. In such a case, the apparatus/system may include additional circuitry and mechanisms (not shown) to measure RRO, and then use a read/write head 212 to write the R-RRO and W-RRO values to pre-servo gap and servo wedge as described hereinbelow. Instead of (or in addition to) a servo gap data detect module 212, such an apparatus may include a servo gap writing module 230 within the servo controller 216. Specific examples of how such a servo gap writing module 230 may operate are described in greater detail below.

Existing manufacturing processes use the servo sync-mark as a timing reference for a programmed delay that commences the writing of an RRO value. In some implementations, this delay is determined from calibration procedures that determine the delay that will efficiently write the RRO value as close as possible to the preceding servo data without overwriting it. This procedure generally involves writing trial RRO fields with a delay that ensures a safe distance away from servo, and writing it with incrementally decreasing delays until the RRO sync-mark is detected within a desired timing window.

Figure 3:
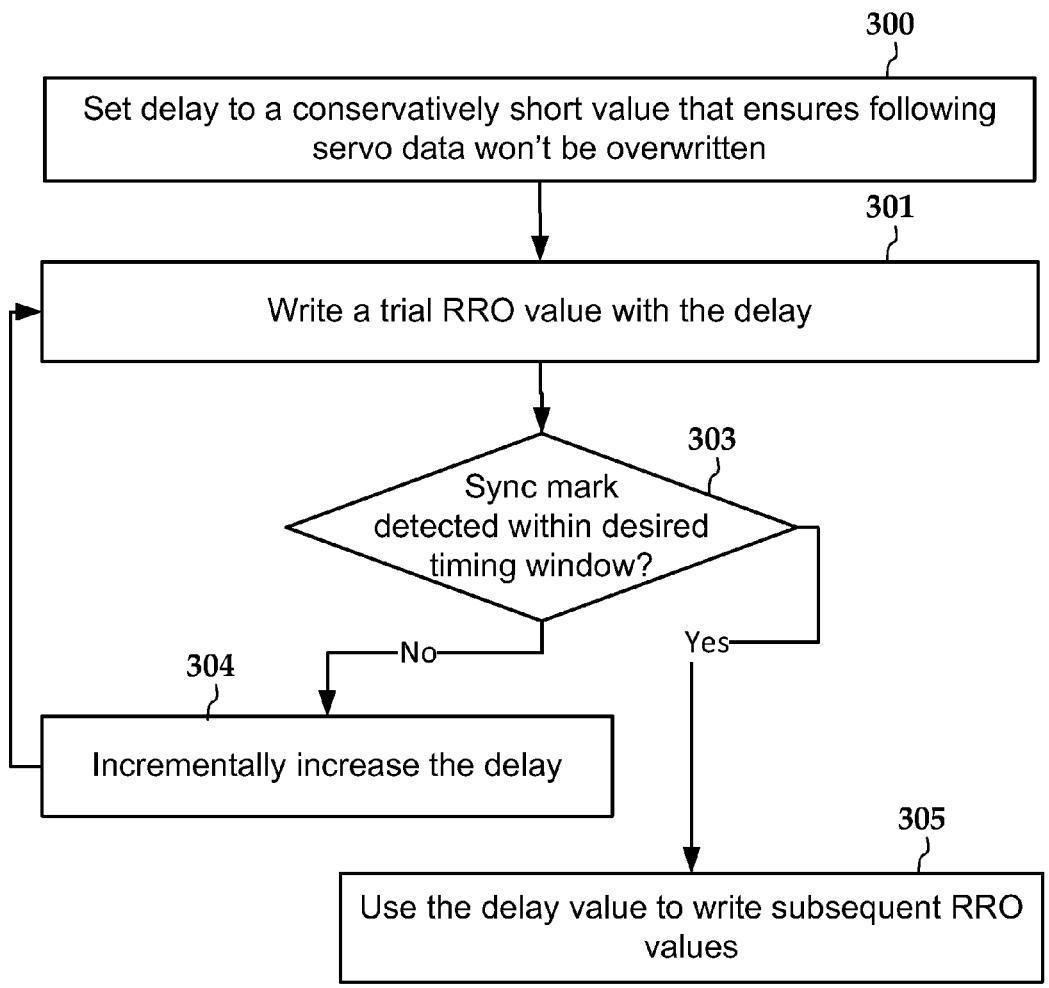
FIG. 3 is a flowchart illustrating a method according to an example embodiment.

The RRO correction values can be written in the pre-servo gap using a procedure similar in some respects to existing RRO field writing procedures. An example embodiment of this procedure is shown in the flow chart of FIG. 3. This procedure may be implemented, for example, in a servo gap data write module 230 as shown in FIG. 2. In FIG. 3, a delay is set 300 to a conservatively short delay that ensures that the servo wedge data following the gap won't be overwritten. A trial RRO value is written 301 with the delay. The delay is incrementally increased 304 until the RRO sync-mark is detected 303 within a desired timing window. The delay value is used 305 to write subsequent RRO values.

As an example of how the delay value may be used 305, a processing arrangement may time-stamp the RRO detection with a count of disk synchronous clock periods from the servo sync-mark to explicitly indicate the position at which the trial value was written. This count of periods could be used to write subsequent RRO values in the pre-servo gaps, and may be periodically tested and adjusted. This would enable an expeditious determination of the optimal write delay relative to existing trial-and-error methods.

Writing an RRO field in the gap before the servo wedge may create a conflict during production where a write is needed while the read head/transducer is over the adjacent servo fields. In reference again to FIG. 1, the read head 112 and write head 114 may be part of production equipment used to write the RRO data associated with the servo wedge 102. In order to write an R-RRO value in gap data block region 116, the adjacent servo fields such as preamble 102*a* and SAM 102*b* may need to be read and demodulated to maintain the track positioning required for writing the RRO values.

One strategy to deal with the conflict noted above is to write repeatable runout fields to a track using two passes, each of the two passes writing respective repeatable runout values to pre-servo gaps associated with alternating servo wedges. In such a case, a manufacturing apparatus or system alternates between first wedges where R-RRO values are written in the pre-servo gap while skipping servo demodulation, and second wedges where servo wedge is demodulated and no R-RRO values are written to the pre-servo gap. For example, even-wedge R-RRO values could be written in one revolution, and the odd-wedge R-RRO values written in another revolution. During this time, the servo loop could be running at reduced-sample-rate (e.g., getting position feedback from every other servo) to account for skipping half of the servo wedge sync marks.

Reduced-rate sampling is viable for this process, since RRO values are only written during manufacturing, where the environment can be controlled, and recovery from position excursions have no impact to the end user. During the first pass of writing RRO values (e.g., even wedge RRO values), the RRO correction values can be measured and stored for the current track. The stored RRO correction values can be subsequently sourced from electronic storage (e.g., SRAM or buffer memory) instead of the media when making a second pass over the same track to write RRO values (e.g., odd wedge RRO values).

The storage of R-RRO values in the pre-servo gap increases the user data by an amount approximately equal to the number of servo wedges times the length of the R-RRO field, or more precisely, the parts of the R-RRO field that aren't shared by the W-RRO field. If the R-RRO field with its associated overhead (spacer, preamble, syncronization data, optional parity) doesn't completely fit into the available space of the pre-servo gap, the gap length may be increased. In such a case, the format gain is reduced by however much the gap length increases. However, even if the gap length increases in such a case, storage of servo data in the gap can still lead to a net overall gain in user data storage efficiency.

The format efficiency gained by this strategy depends on many product-specific parameters, including, among other things, the number of servo wedges per track, servo frequency, amount of R-RRO bits used for the program and the particulars of RRO field formatting. An order-of-magnitude estimate can be calculated from an example case of a drive with the following parameters: 7200 RPM drive with 472 wedges/track and 180 MHz servo pattern frequency; 5 micron writer-reader separation; inner/outer radius of 0.7"/1.8", Pvt2Ctr/Pvt2Gap of 2.2"/1.9" yielding a skew range of +16°; R-RRO field includes 4 bits of overhead for spacer, preamble, and sync, 6 bits of payload, and 1 bit of parity (a "bit"=one servo frequency cycle).

Figure 4:
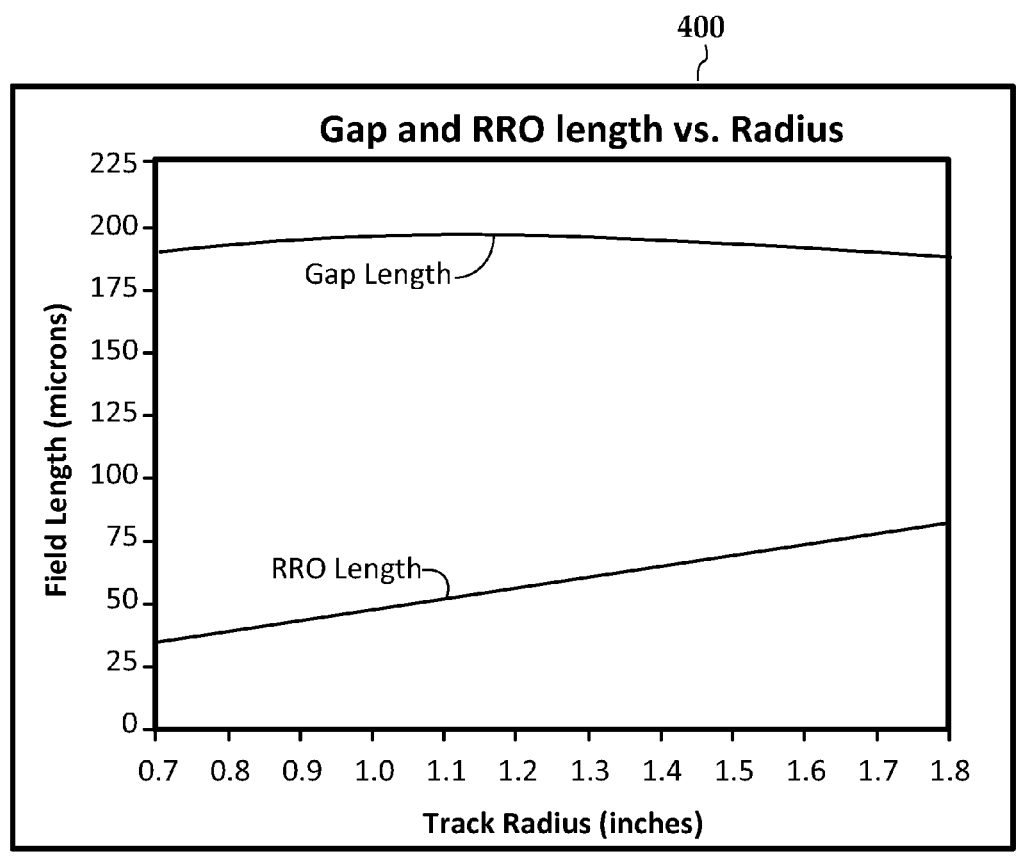
FIG. 4 is a graph illustrating pre-servo gap length and repeatable runout value length versus track radius according to an example embodiment.

The chart 400 in FIG. 4 plots the length of the pre-servo gap and the RRO length as a function of track radius using the above example parameters. The chart 400 shows that for the configuration of this example, the R-RRO field fits into the previously-unused pre-servo gap with room to spare. The combined length of the 472 Read RRO fields is 0.35% of each track so moving them into the gap frees up 0.35% of each track for additional user data (or other data).

Figure 5:
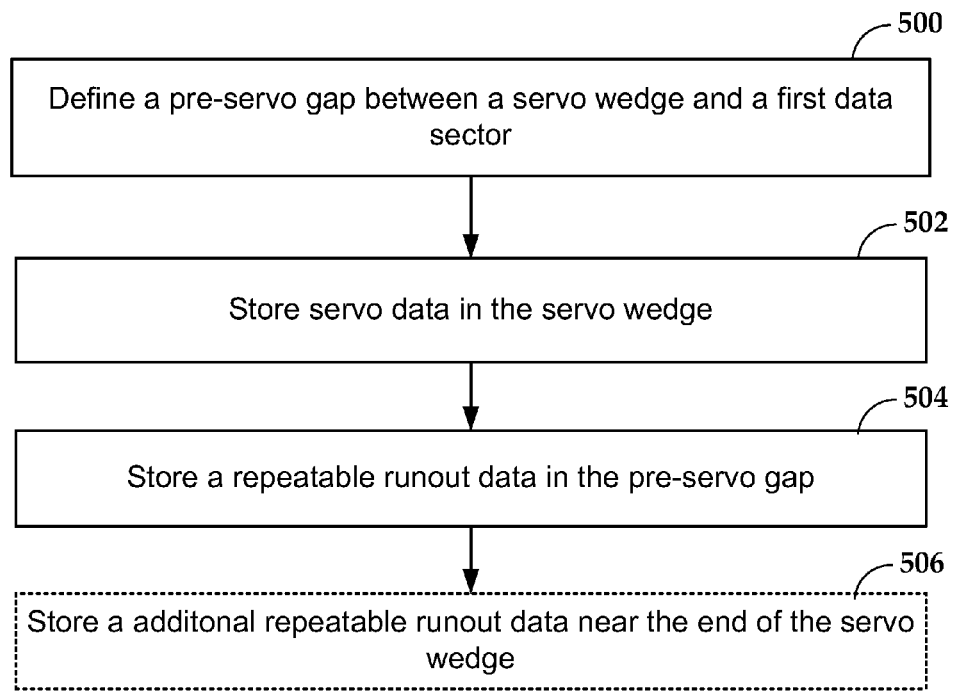
FIGS. 5 and 6 are flowcharts illustrating methods according to an example embodiment.

In reference now to FIG. 5, a flowchart illustrates a method according to an example embodiment. The method involves defining 500 a pre-servo gap between a servo wedge and a first data sector of a track of a data storage medium. A start of the servo wedge is proximate to the pre-servo gap, and an end of the servo wedge is proximate a second data sector. Servo data is stored 502 in the servo wedge.

A repeatable runout field is stored 504 in the pre-servo gap. The repeatable runout field includes repeatable runout data (e.g., correction values), and may include other data (e.g., preamble, synchronization data). Optionally, a second repeatable runout field may be stored 506 at the end of the servo wedge. For example, the first repeatable runout field may include read-data RRO correction values, and the second repeatable runout field may include write-data RRO correction values.

A size of the pre-servo gap may be defined by (or correspond to) at least a downtrack separation distance of a read transducer and a write transducer of a slider that reads from and writes to the data storage medium. The servo gap size may also be increased to include some overhead space, e.g., to account for tolerances. The storing 504 of the repeatable runout field may involve synchronizing a writing of the repeatable runout field in the pre-servo gap based on a synchronization signal obtained from an adjacent (e.g., preceding) servo wedge. Similarly, when reading the repeatable runout field to correct for runout, reading the repeatable runout field may involve synchronizing the reading of the repeatable runout field in the pre-servo gap based on a synchronization signal obtained from an adjacent e.g., preceding) servo wedge.

Figure 6:
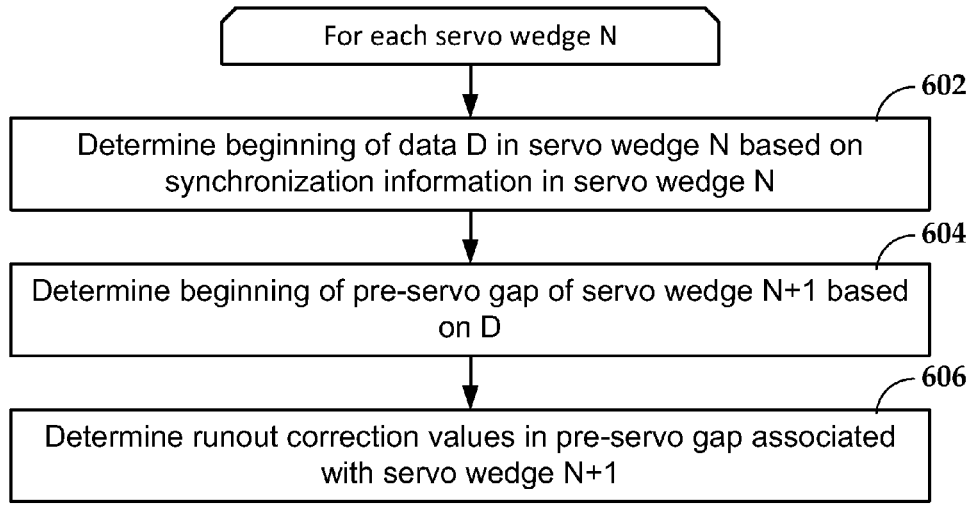

In reference now to FIG. 6, a flowchart illustrates a method according to another example embodiment. The flowchart shows how synchronization signals/data of a preceding servo data wedge can be used to determine beginning of a pre-servo gap and data stored within. For the Nth servo wedge, the beginning of data in the servo wedge N is determined based on synchronization data in the servo wedge N. Generally, this involves examining fields such as preamble and SAM, and generally locates the beginning of a data field (e.g., address) within the servo wedge N, although can be considered as finding the beginning of the wedge itself, e.g., can be determined based on a disk synchronous clock count preceding the start of the data field.

Based on the synchronization data of servo wedge N, beginning of a servo gap preceding servo wedge N+1 is also determined 604. This will facilitate determining 606 runout correction values stored in the pre-servo gap and that are associated with servo wedge N+1.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A data storage medium comprising:
   first and second data sectors of a track;
   a pre-servo gap proximate the first data sector;
   a servo wedge that stores servo data for the track, a start of the servo wedge being proximate to the pre-servo-gap and an end of the servo wedge being proximate to the second data sector; and
   a repeatable runout field in the pre-servo gap that comprises repeatable runout data.

2. The data storage medium of claim 1, wherein a size of the pre-servo gap corresponds to at least a downtrack separation distance of a read transducer and a write transducer of a slider that reads from and writes to the data storage medium.

3. The data storage medium of claim 1, wherein the repeatable runout field comprises a data-read correction value.

4. The data storage medium of claim 3, further comprising a second repeatable runout field at the end of the servo wedge, the second repeatable runout field comprising a data-write correction value.

5. The data storage medium of claim 1, further comprising a second repeatable runout field at the end of the servo wedge.

6. The data storage medium of claim 1, wherein the servo wedge further comprises a preamble following the pre-servo gap.

7. The data storage medium of claim 1, wherein the repeatable runout field comprises a preamble and synchronization data that facilitates detecting the repeatable runout field.

8. A method comprising:
   defining a pre-servo gap between a servo wedge and a first data sector of a track of a data storage medium, a start of the servo wedge being proximate to the pre-servo gap;
   storing servo data in the servo wedge between the pre-servo gap and a second data sector, an end of the servo wedge being proximate to the second data sector; and
   storing a repeatable runout field in the pre-servo gap that comprises repeatable runout data.

9. The method of claim 8, wherein a size of the pre-servo gap corresponds to at least a downtrack separation distance of a read transducer and a write transducer of a slider that reads from and writes to the data storage medium.

10. The method of claim 8, wherein the repeatable runout field comprises correction values for a data-read correction value.

11. The method of claim 10, further comprising storing a second repeatable runout field at the end of the servo wedge, the second repeatable runout field comprising a data-write correction value.

12. The method of claim 8, further comprising storing a second repeatable runout field at the end of the servo wedge.

13. The method of claim 8, wherein storing the repeatable runout field comprises synchronizing a writing of the repeatable runout field in the pre-servo gap based on a synchronization signal obtained from an adjacent servo wedge.

14. The method of claim 8, further comprising reading the repeatable runout field to correct for runout, wherein the reading of the repeatable runout field comprises synchronizing the reading of the repeatable runout field in the pre-servo gap based on a synchronization signal obtained from an adjacent servo wedge.

15. A system comprising:
- a slider comprising a read transducer and a write transducer separated by a downtrack separation distance;
- a data storage medium configured to rotate proximate to the slider, the data storage medium comprising:
  - first and second data sectors of a track;
  - a pre-servo gap proximate the first data sector and having a size that corresponds to at least the downtrack separation distance;
  - a servo wedge that stores servo data for the track, a start of the servo wedge being proximate to the pre-servo gap and an end of the servo wedge being proximate to the second data sector; and
  - located in the pre-servo gap, a repeatable runout field that stores repeatable runout data.

16. The system of claim 15, wherein the data storage medium is configured to rotate relative to the slider so that the read transducer is proximate to the pre-servo gap before the write transducer, the repeatable runout field comprising a data-read correction value.

17. The system of claim 16, wherein the servo wedge comprises a second repeatable runout field at the end of the servo wedge, the second repeatable runout field comprising a data-write correction value.

18. The system of claim 15, further comprising a controller that synchronizes writing, via the write transducer, of the repeatable runout field in the pre-servo gap based on a synchronization signal obtained from an adjacent servo wedge.

19. The system of claim 18, wherein the controller further causes repeatable runout fields to be written, via the write transducer, to the track using two passes, wherein during each pass respective repeatable runout values are written to pre-servo gaps associated with alternating servo wedges.

20. The system of claim 15, further comprising a controller that reads, via the read transducer, the repeatable runout field to correct for runout, wherein the reading of the repeatable runout field comprises synchronizing the reading of the repeatable runout field in the pre-servo gap based on a synchronization signal obtained from an adjacent servo wedge.

* * * * *